(12) United States Patent
Deng et al.

(10) Patent No.: US 9,531,281 B2
(45) Date of Patent: *Dec. 27, 2016

(54) AC-DC POWER CONVERTER

(71) Applicant: Silergy Semiconductor Technology (Hangzhou) LTD, Hangzhou, ZheJiang Province (CN)

(72) Inventors: Jian Deng, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,303

(22) Filed: Aug. 12, 2015

(65) Prior Publication Data

US 2015/0365004 A1 Dec. 17, 2015

Related U.S. Application Data

(63) Continuation of application No. 14/093,594, filed on Dec. 2, 2013, now Pat. No. 9,144,125.

(30) Foreign Application Priority Data

Dec. 11, 2012 (CN) .......................... 2012 1 0538817

(51) Int. Cl.
*H02M 3/335* (2006.01)
*H05B 33/08* (2006.01)
(Continued)

(52) U.S. Cl.
CPC ....... *H02M 3/33523* (2013.01); *H02M 1/4258* (2013.01); *H05B 33/0815* (2013.01);
(Continued)

(58) Field of Classification Search
CPC ............ H05B 33/0815; H05B 33/0848; H05B 33/0845; H05B 33/0851; H05B 33/0842; H05B 33/0854; H05B 33/0866; H05B 41/3927; H05B 33/0833; H05B 33/0812
(Continued)

(56) References Cited

U.S. PATENT DOCUMENTS 8,076,920 B1 12/2011 Melanson
2012/0319604 A1 12/2012 Walters
(Continued)

FOREIGN PATENT DOCUMENTS

CN 102938617 A 2/2013

*Primary Examiner* — Tuyet Vo
(74) *Attorney, Agent, or Firm* — Michael C. Stephens, Jr.

(57) ABSTRACT

In one embodiment, an AC-DC power converter can include: (i) a rectifier bridge and filter to convert an external AC voltage to a DC input voltage; (ii) a first energy storage element to store energy from the DC input voltage via a first current through a first conductive path when in a first operation mode; (iii) a second energy storage element configured to store energy from a second DC voltage via a second current through a second conductive path when in the first operation mode; (iv) a transistor configured to share the first and second conductive paths; (v) the first energy storage element releasing energy to a third energy storage element and a load through a third conductive path when in a second operation mode; and (vi) the second energy storage element releasing energy to the load through a fourth conductive path during the second operation mode.

22 Claims, 14 Drawing Sheets

(51) Int. Cl.
*H02M 1/42* (2007.01)
*H05B 41/282* (2006.01)
(52) U.S. Cl.
CPC ..... *H05B 33/0845* (2013.01); *H05B 41/2822* (2013.01); *Y02B 20/348* (2013.01); *Y02B 70/126* (2013.01)
(58) Field of Classification Search
USPC ............... 315/247, 224, 225, 307–312, 291, 315/185 S, 209 R, 246, 276–289
See application file for complete search history.

(56) References Cited

U.S. PATENT DOCUMENTS

| | | |
|---|---|---|
| 2013/0033197 A1 | 2/2013 | Hwang et al. |
| 2013/0300310 A1 | 11/2013 | Hu |
| 2014/0117865 A1 | 5/2014 | Deng et al. |
| 2014/0167649 A1 | 6/2014 | Jen et al. |

AC-DC POWER CONVERTER

RELATED APPLICATIONS

This application is a continuation of the following application, U.S. patent application Ser. No. 14/093,594, filed on Dec. 2, 2013, and which is hereby incorporated by reference as if it is set forth in full in this specification, and which also claims the benefit of Chinese Patent Application No. 201210538817.5, filed on Dec. 11, 2012, which is incorporated herein by reference in its entirety.

FIELD OF THE INVENTION

The present invention relates to the field of electronics, and more particularly to an AC-DC power converter.

BACKGROUND

An AC-DC power converter is used to convert an AC voltage into a constant DC electrical signal, such as a DC voltage or DC current. Because of the relatively high power of AC-DC power converters, they are widely used to drive high power loads (e.g., motors, light-emitting diode [LED] lights, etc.). An AC-DC power converter can include a rectifier bridge to convert the external AC voltage into a sine half-wave DC input voltage for the conversion circuit. To reduce AC grid harmonic pollution, an AC-DC power converter may utilize a power factor correction (PFC) circuit through which a relative high power factor can be obtained.

SUMMARY

In one embodiment, an AC-DC power converter can include: (i) a rectifier bridge and filter configured to convert an external AC voltage to a sine half-wave DC input voltage; (ii) a first energy storage element configured to store energy from the sine half-wave DC input voltage via a first current through a first conductive path when in a first operation mode, where the first current rises during the first operation mode; (iii) a second energy storage element configured to store energy from a second DC voltage via a second current through a second conductive path when in the first operation mode, where the second current rises during the first operation mode; (iv) a transistor configured to share the first and second conductive paths; (v) the first energy storage element being configured to release energy to a third energy storage element and a load through a third conductive path when in a second operation mode, where the second DC voltage is configured to be generated on the third energy storage element, and where the first current declines during the second operation mode; and (vi) the second energy storage element being configured to release energy to the load through a fourth conductive path during the second operation mode, where a peak value of the first current is configured to vary along with the sine half-wave DC input voltage, and an output of the AC-DC converter is configured to be substantially constant.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
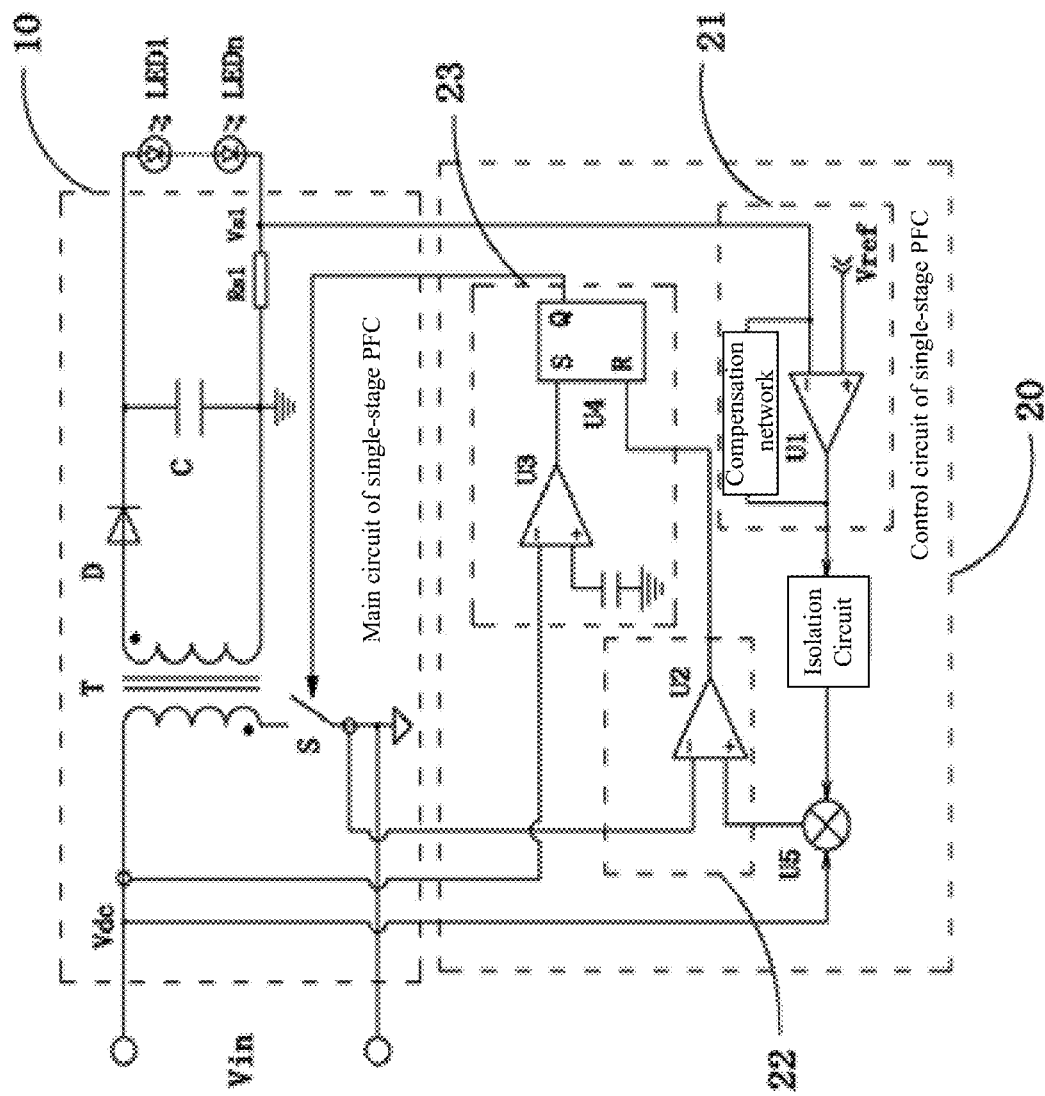
FIG. 1 is a schematic block diagram of an example single-stage AC-DC power converter.

Referring now to FIG. 1, shown is an example single-stage AC-DC power converter. In this particular example, the single-stage AC-DC power converter can include single-stage power factor correction (PFC) main circuit 10 and single-stage PFC control circuit 20. For example, the single-stage PFC main circuit may be a flyback topology, and the single-stage PFC control circuit can include current closed loop control circuit 21, current control circuit 22, flip-flop circuit 23, the isolation circuit, and multiplier U5.

Current closed loop control circuit 21 may sample the output current of the single-stage PFC main circuit. After flowing through the isolation circuit, the output signal of circuit 21 can be provided along with the input voltage to multiplier U5. Multiplier U5 can generate a signal that acts as a reference signal for the in-phase input terminal of current control circuit 22. The inverted input terminal of circuit 22 can sample the input current, and the output of current control circuit 22 can be provided to zero trigger circuit 23. Zero trigger circuit 23 can include voltage comparator U3 and RS flip-flop U4.

An output of current control circuit 22 and an output of voltage comparator U3 can be coupled to reset R and set S of the RS flip-flop, respectively. The output of RS flip-flop U4 can essentially make the input current vary along with the variation of the input voltage by controlling the state of switch S. In this way, the power factor of the single-stage PFC circuit may be improved relative to other approaches. However, when the output current has relatively large ripples (e.g., due to a transient load), the error of the output current may also be relatively large. Therefore, the input current may have relatively large errors, and may not accurately vary along with the input voltage variation, thus reducing the power factor.

Figure 2:
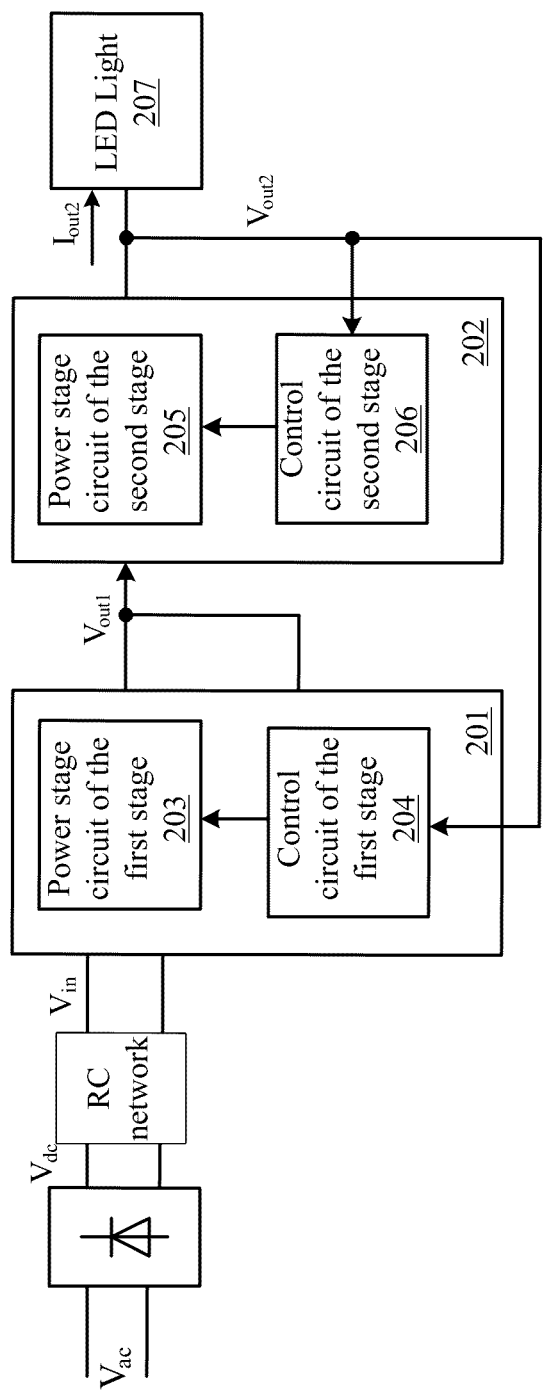
FIG. 2 is a schematic block diagram of an example two-stage AC-DC power converter.

Referring now to FIG. 2, shown is a schematic block diagram of an example two-stage AC-DC power converter. In this particular example, the AC-DC power converter can include two-stage power stage circuits 203 and 205, as well as a first-stage control circuit 204 and a second stage control circuit 206. The first stage power stage circuit 203 can receive the sine half-wave DC input voltage (e.g., $V_{in}$). First stage control circuit 204 can control first stage power-stage circuit 203 to make the wave of the input current vary along with the variation of the sine half-wave DC input voltage, so as to realize power factor correction. Second stage power stage circuit 205, which may be cascaded to the first stage power stage circuit, can receive output voltage $V_{out1}$ of the first stage power stage circuit 203. According to driving voltages required by light-emitting diode (LED) light 207, second stage control circuit 206 can control second stage power stage circuit 205 to provide substantially constant output current and output voltage.

The example AC-DC power converter of FIG. 2 may have relatively good operational effects on harmonic waves, and can achieve a relatively high power factor. This example power converter has an independent PFC stage, through which pre-adjustment can occur for the DC voltage provided to be DC-DC stage. Thus, the output voltage may be relatively accurate, and this approach may be particularly suitable for high power applications with good on-load capacity. However, at least two sets of control circuits and power transistors are utilized in this approach, thus increasing product costs. Further, the power density may be relatively low, and the power consumption may be relatively large. Thus, this converter structure may not be particularly suitable for small or middle sized power electronic equipment.

In one embodiment, an AC-DC power converter can include: (i) a rectifier bridge and filter configured to convert an external AC voltage to a sine half-wave DC input voltage; (ii) a first energy storage element configured to store energy from the sine half-wave DC input voltage via a first current through a first conductive path when in a first operation mode, where the first current rises during the first operation mode; (iii) a second energy storage element configured to store energy from a second DC voltage via a second current through a second conductive path when in the first operation mode, where the second current rises during the first operation mode; (iv) a transistor configured to share the first and second conductive paths; (v) the first energy storage element being configured to release energy to a third energy storage element and a load through a third conductive path when in a second operation mode, where the second DC voltage is configured to be generated on the third energy storage element, and where the first current declines during the second operation mode; and (vi) the second energy storage element being configured to release energy to the load through a fourth conductive path during the second operation mode, where a peak value of the first current is configured to vary along with the sine half-wave DC input voltage, and an output of the AC-DC converter is configured to be substantially constant.

Figure 3A:
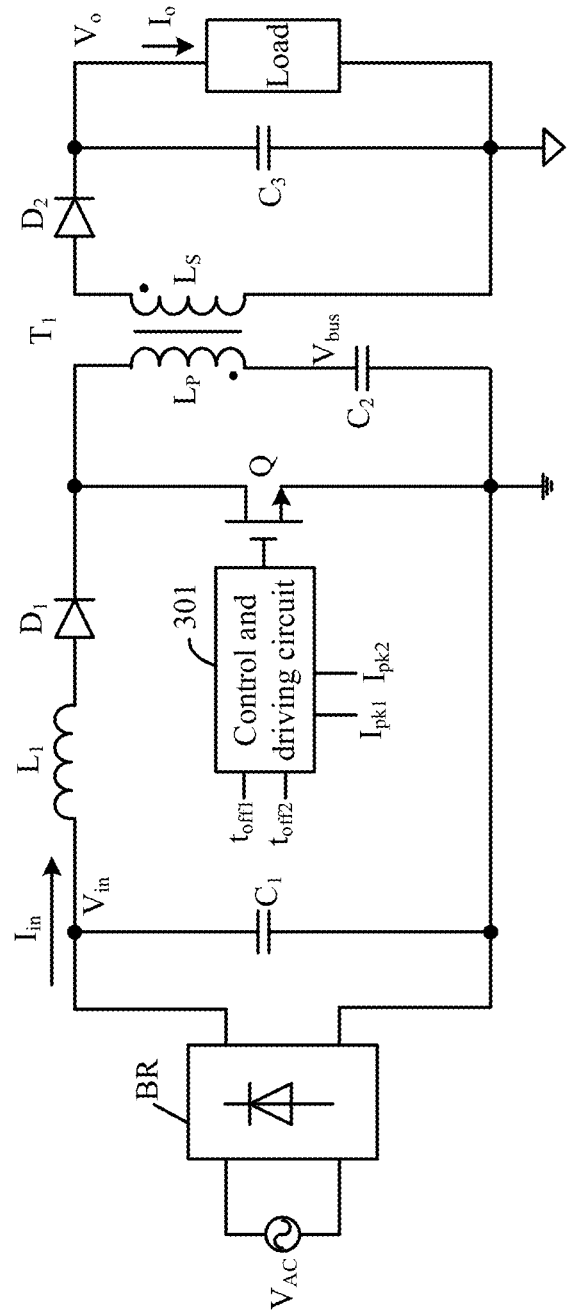
FIG. 3A is a schematic block diagram of a first example AC-DC power converter in accordance with embodiments of the present invention.

Referring now to FIG. 3A, shown is a schematic block diagram of a first example AC-DC power converter in accordance with embodiments of the present invention. In this example, after being rectified and filtered by rectifier bridge BR and filter capacitor $C_1$, the external AC voltage can be converted into sine half-wave DC input voltage $V_{in}$. The AC-DC power converter can also include a first energy storage element (e.g., inductor $L_1$), a second energy storage element (e.g., transformer $T_1$ including primary side windings $L_p$ and secondary side windings $L_s$), and a third energy storage element (e.g., capacitor $C_2$). In addition, the AC-DC power converter can include control and driving circuit 301, which can control a switching state (e.g., on or off) of transistor Q.

Figure 3B:
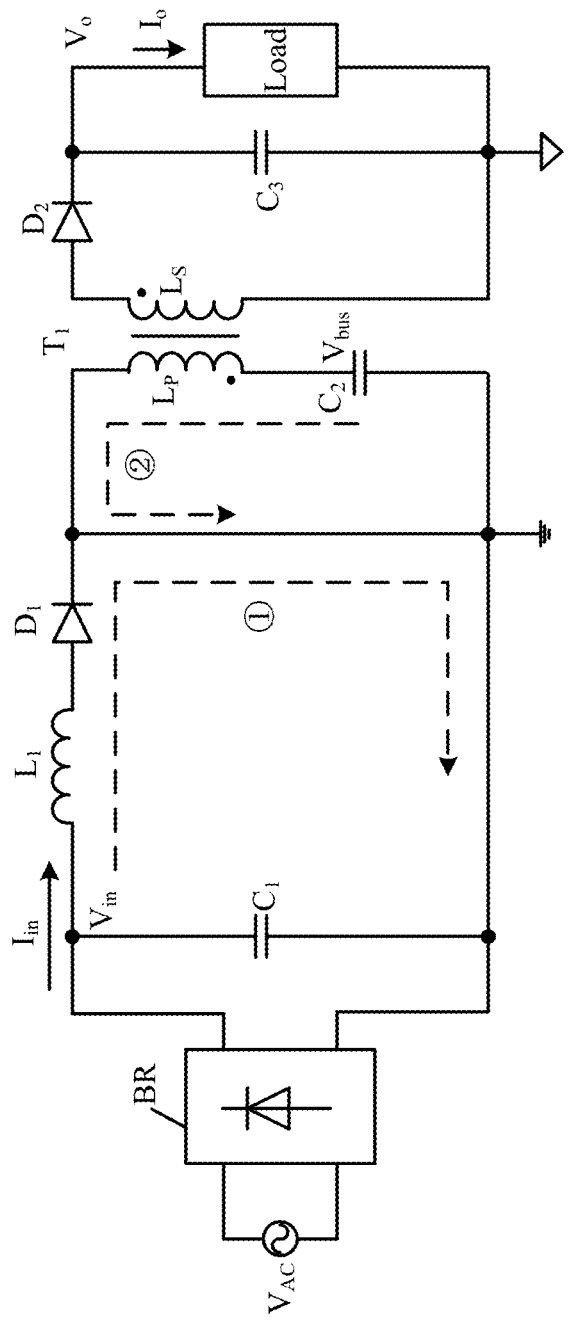
FIG. 3B shows a conductive path diagram for the AC-DC power converter of FIG. 3A in a first operation mode.

Referring now to FIG. 3B, shown is a conductive path diagram for the AC-DC power converter of FIG. 3A in a first operation mode. When in the first operation mode, control and driving circuit 301 can control transistor Q to turn on, and inductor $L_1$, diode $D_1$, and switch Q can form a first conductive path (denoted by an encircled "1"). The sine half-wave DC input voltage can store energy in inductor $L_1$ by the first conductive path, and current $I_1$ flowing through inductor $L_1$ can rise (e.g., continuously) as part of the first conductive path.

Also during the first operation mode, capacitor $C_2$, primary side windings $L_p$ of transformer $T_1$, and transistor or switch Q can form a second conductive path (denoted by an encircled "2"). In the second conductive path, DC voltage $V_{bus}$ across capacitor $C_2$ can release energy to primary side windings $L_p$. Transformer $T_1$ can store energy, and current $I_2$ of secondary side windings $L_p$ can rise (e.g., continuously) as part of the second conductive path.

Figure 3C:
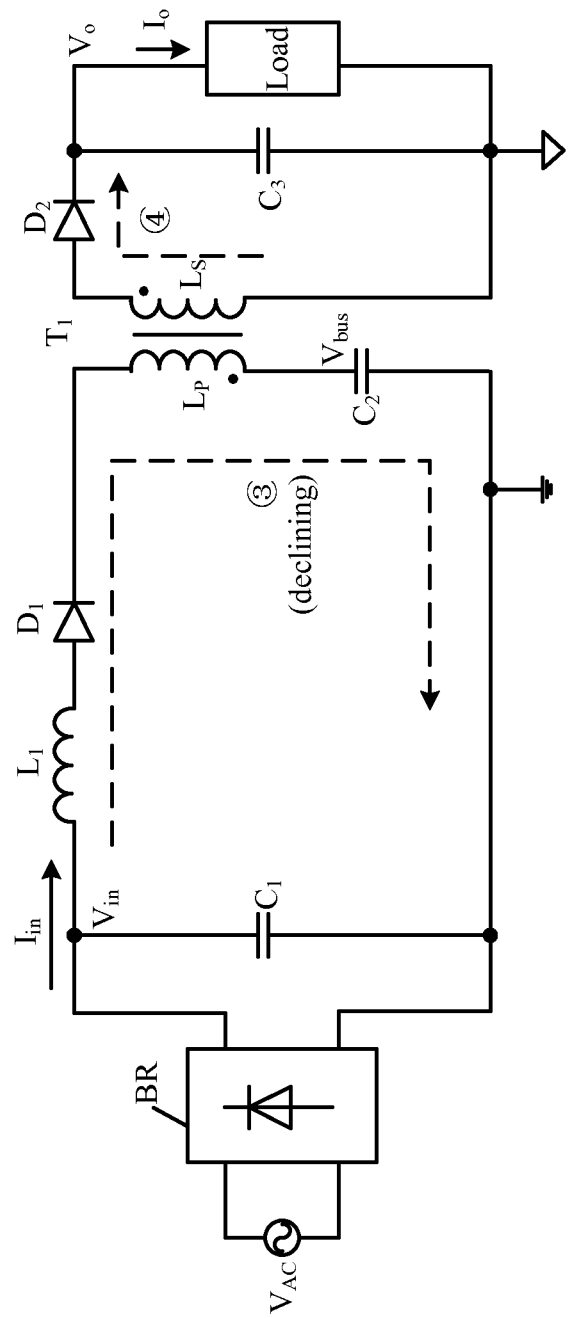
FIG. 3C shows a conductive path diagram for the AC-DC power converter of FIG. 3A in a second operation mode.

Referring now to FIG. 3C, shown is a conductive path diagram for the AC-DC power converter of FIG. 3A in a second operation mode. When in the second operation mode, control and driving circuit 301 can turn off transistor Q, and inductor $L_1$, diode $D_1$, primary side windings $L_p$ of transformer $T_1$, and capacitor $C_2$ can form a third conductive path (denoted by an encircled "3"). Inductor $L_1$ can release energy, and current $I_1$ can decline (e.g., continuously) as part of the third conductive path. For example, a switching cycle of the AC-DC power converter can include the first and second operation modes.

A portion of the energy released by inductor $L_1$ can be transferred to the load by transformer $T_1$, and a remaining portion of the energy released by inductor $L_1$ can be used to charge capacitor $C_2$. DC voltage $V_{bus}$ can be generated across the two terminals of capacitor $C_2$. Secondary side windings $L_s$ of transformer $T_1$, diode $D_2$, and capacitor $C_3$ can form a fourth conductive path (denoted by an encircled "4"). The energy stored in transformer $T_1$ can be transferred to the load through the fourth conductive path.

For example, diode $D_1$ may be used to prevent current of the third conductive path from flowing back to the input terminal in the second operation mode. In addition, control and driving circuit 301 can receive peak current signals $I_{pk2}$ and $I_{pk2}$ of the first current $I_1$ (flowing through inductor $L_1$) and the second current $I_2$ (of secondary side windings $L_p$). Control and driving circuit 301 can also control time $t_{off1}$ and $t_{off2}$. For example, $t_{off1}$ is the time it takes for the current of inductor $L_1$ to drop to zero from its peak value, and $t_{off2}$ is the time it takes for the current of magnetizing inductance of transformer $T_1$ to drop to zero from its peak value. By controlling $t_{off1}$ and $t_{off2}$, circuit 301 can generate a driving signal to control the switching action of transistor Q, so as to realize power factor correction and a substantially constant output current. For example, peak current signal $I_{pk1}$ and $I_{pk2}$ can be obtained by sampling the first current $I_1$ and the second current $I_2$ by any suitable peak value sampling circuitry.

In addition, the first and third conductive paths in this example can form a boost power stage circuit. The boost power stage circuit can receive sine half-wave DC input voltage $V_{in}$, and may generate a substantially constant DC voltage $V_{bus}$ across capacitor $C_2$. When a value of capacitor $C_2$ is relatively large, the fluctuation of voltage $V_{bus}$ across capacitor $C_2$ can be relatively small. Also, the second and fourth conductive paths can form a flyback power stage circuit. The flyback power stage circuit can receive $V_{bus}$, and may generate a substantially constant output voltage $V_o$ by the fourth conductive path, and a substantially constant output current $I_o$ to drive the load (e.g., an LED load).

In the example of FIGS. 3A-3C, the first conductive path of the boost power stage circuit and the second conductive path of the flyback power stage circuit may share transistor Q and control and driving circuit 301. Thus, transistor Q and control and driving circuit 301 can be utilized in both boost and flyback power stage topologies. As such, the structure of this example AC-DC power converter may represent a simplified control structure, as compared to other approaches.

The following will describe power factor correction realization and substantially constant output signals, as well as the conductive paths under different operation modes, for this example AC-DC power converter. According to operating principles of a flyback power stage circuit, when the excitation inductance current of in the transformer works at a boundary conduction mode (BCM) and the time at which the current of inductor $L_1$ drops to zero is earlier than the time at which the excitation inductance current in transformer drops to zero, the output current can be calculated by the following formula (1).

$$I_o = I_{pk1} \times \frac{n}{2} \times \frac{T_{off1}}{T_S} + I_{pk2} \times \frac{n}{2} \times \frac{T_{off2}}{T_S} \qquad (1)$$

For example, $I_{pk1}$ may denote the peak value of the first current of inductor $L_1$, and $I_{pk2}$ may denote the peak value of the second current of the secondary side windings of transformer $T_1$. Also, n may denote a ratio of the windings between primary side windings $L_p$ and secondary side windings $L_s$ of transformer $T_1$. Further, $t_{off1}$ can denote the time it takes for the current of inductor $L_1$ to drop to zero from its peak value, and $t_{off2}$ can denote the time it takes for the current of excitation inductance of the transformer to drop to zero from its peak value. Also, $t_S$ may denote a switching period (e.g., the sum of $t_{on}$ and $t_{off2}$).

For example, peak value $I_{pk1}$ of the first current can be obtained by the following formula (1.1).

$$I_{pk1} = \frac{V_{in}}{L_1} \times t_{on} \qquad (1.1)$$

Here, $V_{in}$ may denote a sine half-wave DC input voltage, $L_1$ can denote an inductance value of inductor $L_1$, and $t_{on}$ can denote a conduction time of transistor Q. Peak value $I_{pk2}$ of the second current can be obtained by the following formula (1.2).

$$I_{pk2} = \frac{V_{bus}}{L_2} \times t_{on} \qquad (1.2)$$

Figure 4A:
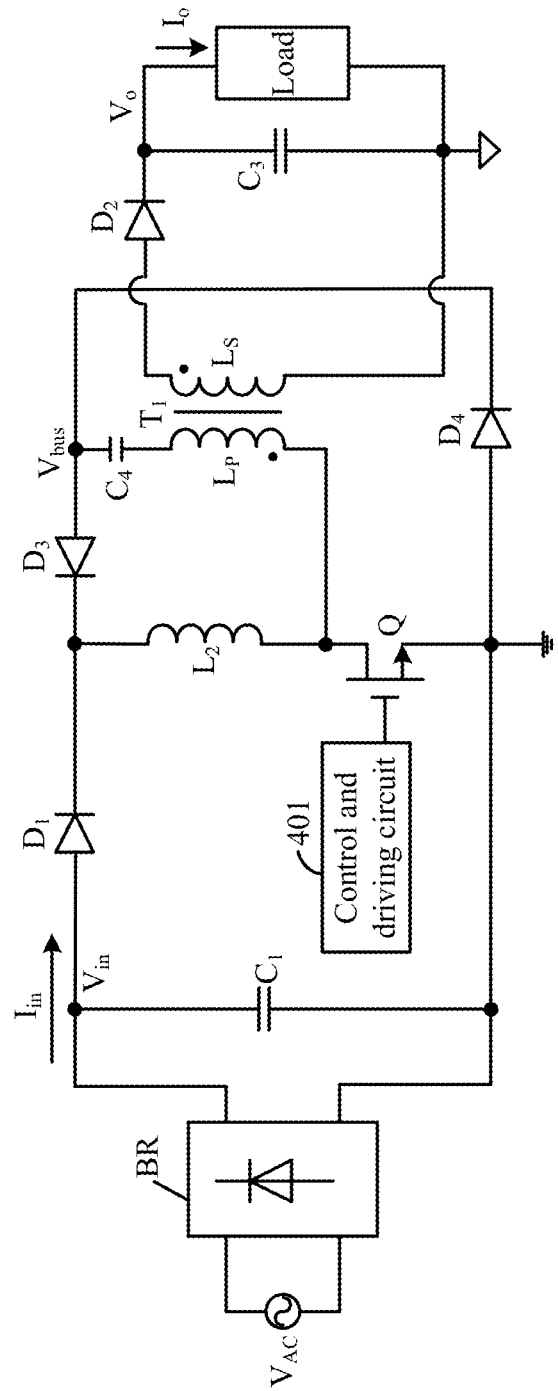
FIG. 4A is a schematic block diagram of a second example AC-DC power converter in accordance with embodiments of the present invention.

Here, $V_{bus}$ can denote the DC voltage across capacitor $C_2$, and $L_2$ can denote the inductance value of inductor $L_2$ (see, e.g., FIG. 4A). In addition, time $t_{off1}$ for the current of inductor $L_1$ to drop to zero from its peak value can be obtained by the formula (1.3).

$$t_{off1} = \frac{V_{in}}{V_{bus} + nV_o - V_{in}} \times t_{on} \qquad (1.3)$$

For example, $V_o$ is the output voltage of the AC-DC power converter, such as provided at the load. Time $t_{off2}$ may be the time it takes for the current of magnetic inductance to drop to zero from its peak value, and its value can be obtained by the formula (1.4).

$$t_{off2} = \frac{V_{bus}}{nV_o} \times t_{on} \qquad (1.4)$$

Switching period $t_S$ can be indicated as below in formula (1.5).

$$t_S = t_{on} + t_{off2} = \frac{V_{bus} + nV_o}{nV_o} \times t_{on} \qquad (1.5)$$

Rearranging formulas of $I_{pk1}$, $I_{pk2}$, $t_{off1}$, $t_{off2}$ and $t_S$ into formula (1) of $I_o$ can provide formula (2).

$$I_o = \frac{n}{2(nV_o + V_{bus})} \times t_{on} \times \left[ \frac{v_{in}^2 \times nV_o}{(V_{bus} + nV_o - V_{in}) \times L_1} + \frac{V_{bus}^2}{L_2} \right] \qquad (2)$$

From formula (2), other than sine half-wave DC input voltage $V_{in}$, all the other voltages in the formula may be substantially constant values. Thus, in order to make $I_o$ constant, conduction time $t_{on}$ of the transistor may be controlled to make the product of the conduction time $t_{on}$ and the first polynomial of formula (2) a constant value. Conduction time $t_{on}$ can be controlled by the control and driving circuit. In this example, control and driving circuit 301 can adjust conduction time $t_{on}$ to control the output current $I_o$ to be substantially constant according to peak value $I_{pk1}$ of the first current, peak value $I_{pk2}$ of the second current, time $t_{off1}$ for the current of inductor $L_1$ to drop to zero from its peak value, and time $t_{off2}$ for the current of primary side windings to drop to zero from its peak value.

Control and driving circuit 301 can be implemented using any suitable circuitry. As can be seen from the above control solutions, the control and driving circuit can sample the primary side signal and calculate the output current according to the sampled primary side signal. In this fashion, substantially constant output current control can be realized by way of primary side control. According to operating principles of the boost power stage circuit, input current $I_{in}$ (the first current of inductor $L_1$) can be calculated by formula (3).

$$I_1 = \frac{I_{pk1}}{2} \times \frac{t_{on} + t_{off1}}{t_S} \quad (3)$$

According to formula (2), conduction time $t_{on}$ can be obtained as shown in formula (3.1).

$$t_{on} = \frac{2 \times I_o \times (nV_o + V_{bus})}{n} \times \frac{(V_{bus} + nV_o - V_{in}) \times L_1 \times L_2}{V_{in}^2 \times nV_o \times L_2 + V_{bus}^2 \times L_1 \times (V_{bus} + nV_o - V_{in})} \quad (3.1)$$

By rearranging the computational formulas of $I_{pk1}$, $t_{on}$, $t_{off1}$, $t_S$ and $t_{on}$ into formula (3) formula (4) can be obtained.

$$I_1 = V_{in} \times \frac{V_o \times I_o \times (V_{bus} + nV_o) \times L_2}{V_{in}^2 \times nV_o \times L_2 + V_{bus}^2 \times L_1 \times (V_{bus} + nV_o - V_{in})} \quad (4)$$

As can be seen from formula (4), as DC voltage $V_{bus}$ is relatively large, the next multinomial can be approximated as a constant. The peak value of input current $I_{in}$ can thus vary approximately with the variation of sine half-wave DC input voltage $V_{in}$, in order to achieve power factor correction. It should be noted that the above derivations of various formulas may be suitable for the derived result when the excitation inductance current of transformer $T_1$ operates in BCM. Of course, transformer $T_1$ may operate in other modes, and other formulas and/or derivations may apply thereto.

As can be seen from the above calculation procedure, in an AC-DC power converter of particular embodiments, for two-stage power stage circuits, only one transistor and one control and driving circuit may be utilised for energy transmission. In addition, power factor correction and output of a substantially constant electrical signal to power a load can also be achieved. When particular embodiments operate in a second operation mode, because energy of both the first energy storage element (e.g., inductor $L_1$) and the second energy storage element (e.g., transformer $T_1$) can be released to the load, the voltage-withstanding or breakdown requirement for the third energy storage element (e.g., capacitor $C_2$) may be relatively low. In addition, particular embodiments utilise relatively simple but high accuracy control, with relatively small ripples and good overall stability, and thus are particularly suitable for the driving of LED type loads.

Referring now to FIG. 4A, shown is a schematic block diagram of a second example AC-DC power converter in accordance with embodiments of the present invention. In this particular example, the first energy storage element of the AC-DC power converter is inductor $L_2$, the second energy storage element is transformer $T_1$ and the third energy storage element is capacitor $C_4$.

Figure 4B:
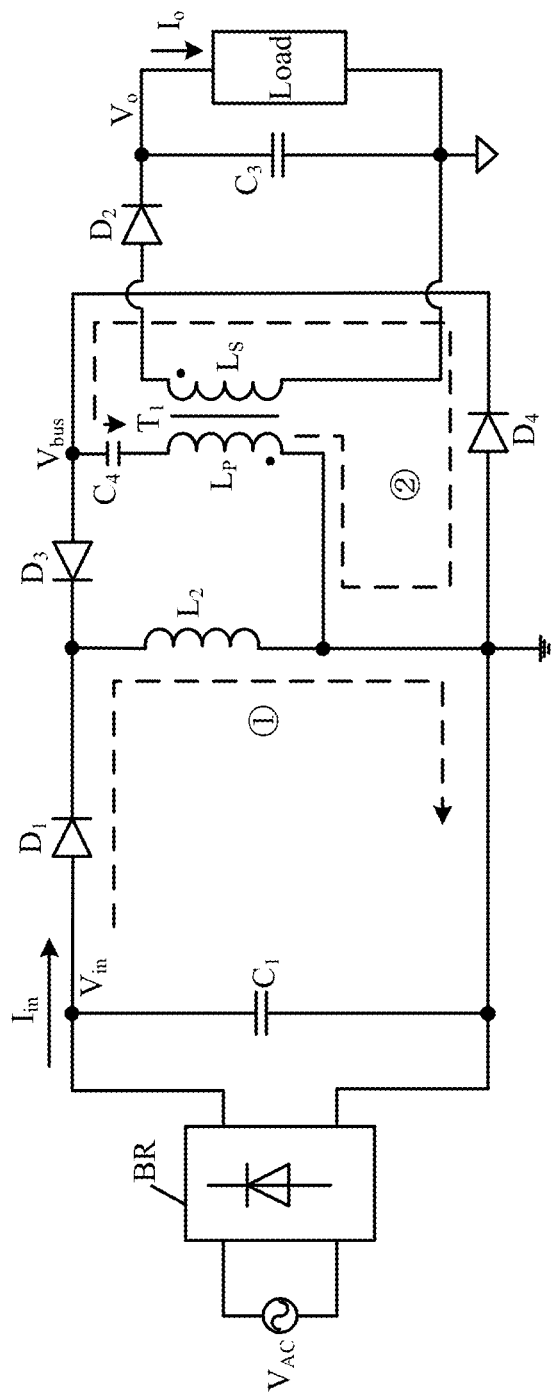
FIG. 4B shows a conductive path diagram for the AC-DC power converter of FIG. 4A in the first operation mode.

Referring now to FIG. 4B, shown is a conductive path diagram for the AC-DC power converter of FIG. 4A in the first operation mode. When in the first operation mode, control and driving circuit 401 can control transistor Q to turn on, and diode $D_1$, inductor $L_2$, and transistor/switch Q can form the first conductive path (denoted by an encircled "1"). The sine half-wave DC input voltage $V_{in}$ can store energy in the inductor $L_2$ through the first conductive path, and then current $I_1$ of the inductor $L_2$ may rise (e.g., continually) in the first conductive path. Also during the first operation mode, primary side windings $L_p$ of transformer $T_1$, diode $D_4$, and capacitor $C_4$ can form a second conductive path (denoted by an encircled "2"), and DC voltage $V_{bus}$ across capacitor $C_4$ can store energy in transformer $T_1$ through the second conductive path. Also, the second current flowing through primary side windings $L_p$ may rise (e.g., continually) as part of the second conductive path.

Figure 4C:
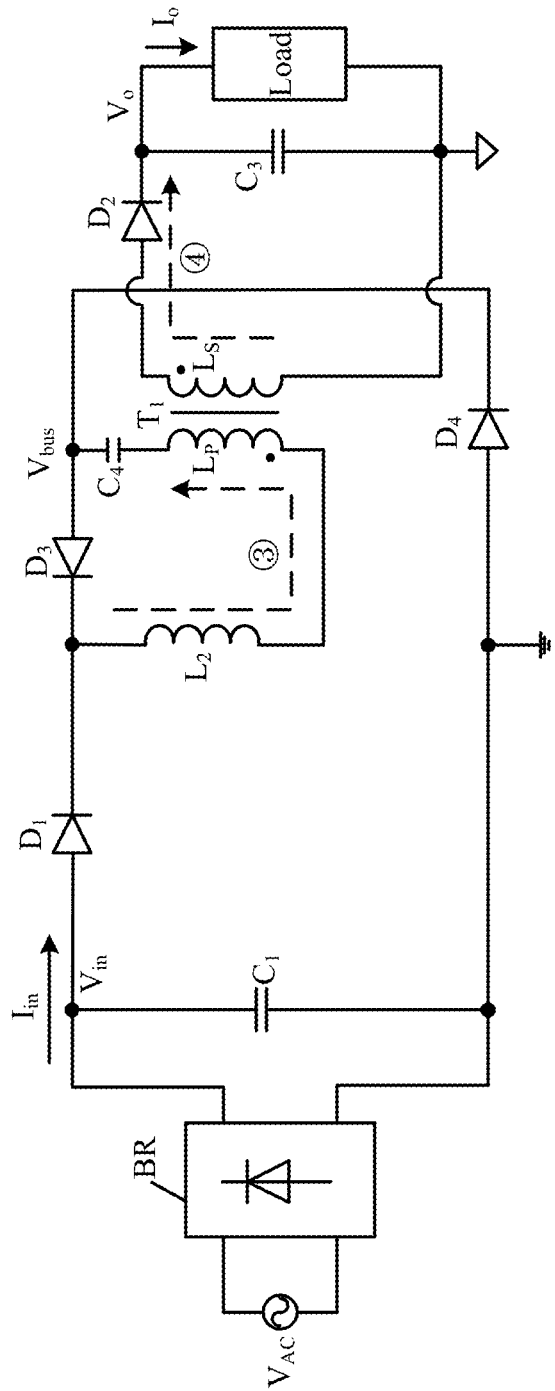
FIG. 4C shows a conductive path diagram for the AC-DC power converter of FIG. 4A in the second operation mode.

Referring now to FIG. 4C, shown is a conductive path diagram for the AC-DC power converter of FIG. 4A when in the second operation mode. In this mode, control and driving circuit 401 can control transistor Q to turn off, and inductor $L_2$, transformer $T_1$, capacitor $C_4$, and diode $D_3$ can form a third conductive path (denoted by an encircled "3"). As part of the third conductive path, inductor $L_2$ may release energy, and the first current flowing through inductor $L_2$ can decline (e.g., continually).

A portion of the energy of inductor $L_2$ may be transferred to the load through transformer $T_1$, and a remaining portion of the energy of inductor $L_2$ may be for charging capacitor $C_4$, and DC voltage $V_{bus}$ can be generated across capacitor $C_4$. When the capacitance of capacitor $C_4$ is relatively large, DC voltage $V_{bus}$ may be nearly constant. Also, secondary side windings $L_s$ of transformer $T_1$, diode $D_2$, and capacitor $C_3$ form a fourth conductive path (denoted by an encircled "4"), and energy stored in transformer $T_1$ may be transferred to the load via the fourth conductive path.

As can be seen from the above, the first and third conductive paths of this example can form a boost-buck power stage circuit. The boost-buck power stage circuit can convert the sine half-wave DC input voltage $V_{in}$ into a substantially constant DC voltage $V_{bus}$ across capacitor $C_4$. The second and fourth conductive paths can form a flyback power stage circuit. The flyback power stage circuit can receive DC voltage $V_{bus}$, and may generate a substantially constant output voltage $V_o$ and a substantially constant output current $I_o$ to drive the LED load. For example, diode $D_3$ can be used to provide a continuing current flow path for inductor $L_2$ for the third conductive path. Also, diode $D_4$ may be used to prevent the input voltage from having a discharge path to ground.

Figure 5A:
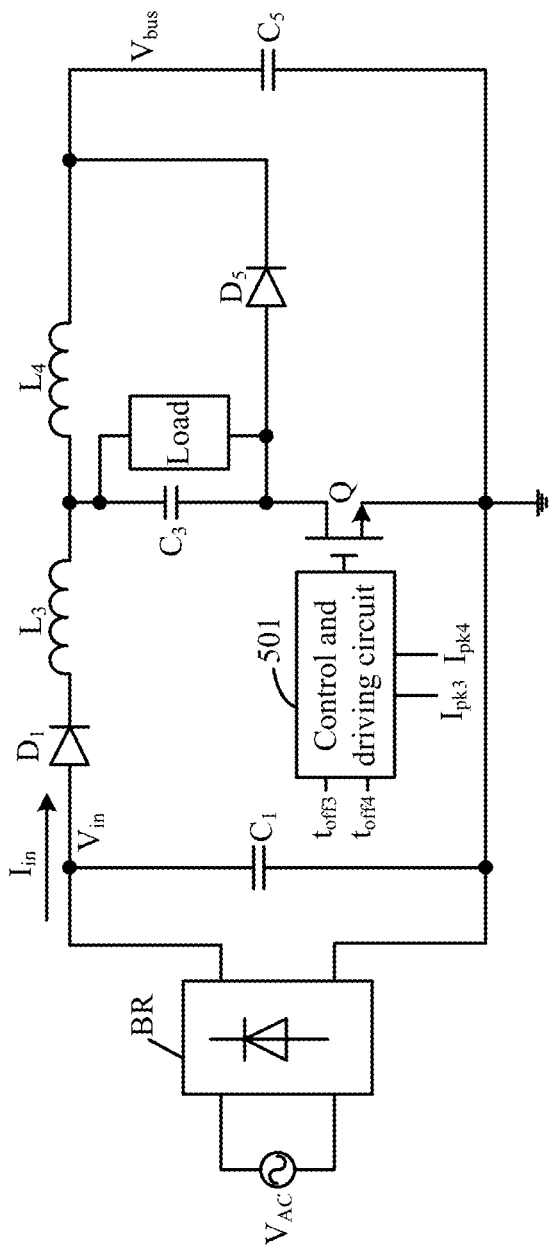
FIG. 5A is a schematic block diagram of a third example AC-DC power converter in accordance with embodiments of the present invention.

Referring now to FIG. 5A, shown is a schematic block diagram of a third example AC-DC power converter in accordance with embodiments of the present invention. In this particular example, the first energy storage element of AC-DC power converter in present embodiment is inductor $L_3$, the second energy storage element is inductor $L_4$, and the third energy storage element is capacitor $C_5$.

Figure 5B:
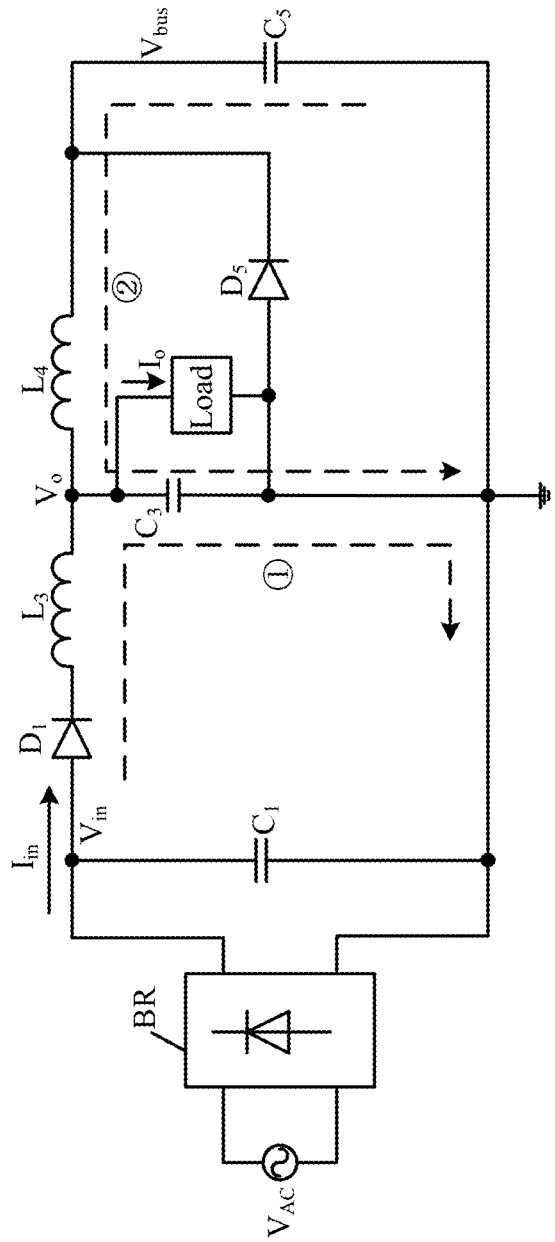
FIG. 5B shows a conductive path diagram for the AC-DC power converter of FIG. 5A in the first operation mode.

Referring now to FIG. 5B, shown is a conductive path diagram for the AC-DC power converter of FIG. 5A when in the first operation mode. In this mode, control and driving circuit 501 can control transistor Q to turn on. Also, diode $D_1$, inductor $L_3$, capacitor $C_3$, and switch Q can form a first conductive path (denoted by an encircled "1"). The sine half-wave DC input voltage can store energy in inductor $L_3$ through the first conductive path, and current $I_1$ of the inductor $T_1$ may rise (e.g., continually) as part of the first conductive path.

The sine half-wave DC input voltage may transfer energy to the load through the first conductive path. Also in the first operation mode, capacitor $C_5$, inductor $L_4$, capacitor $C_3$, and switch Q can form a second conductive path (denoted by an encircled "2"). For the second conductive path, capacitor $C_5$ may release energy, and inductor $L_4$ can store energy. The current of inductor $L_4$ can rise, and the energy of capacitor $C_5$ may be provided to the load via the second conductive path.

Figure 5C:
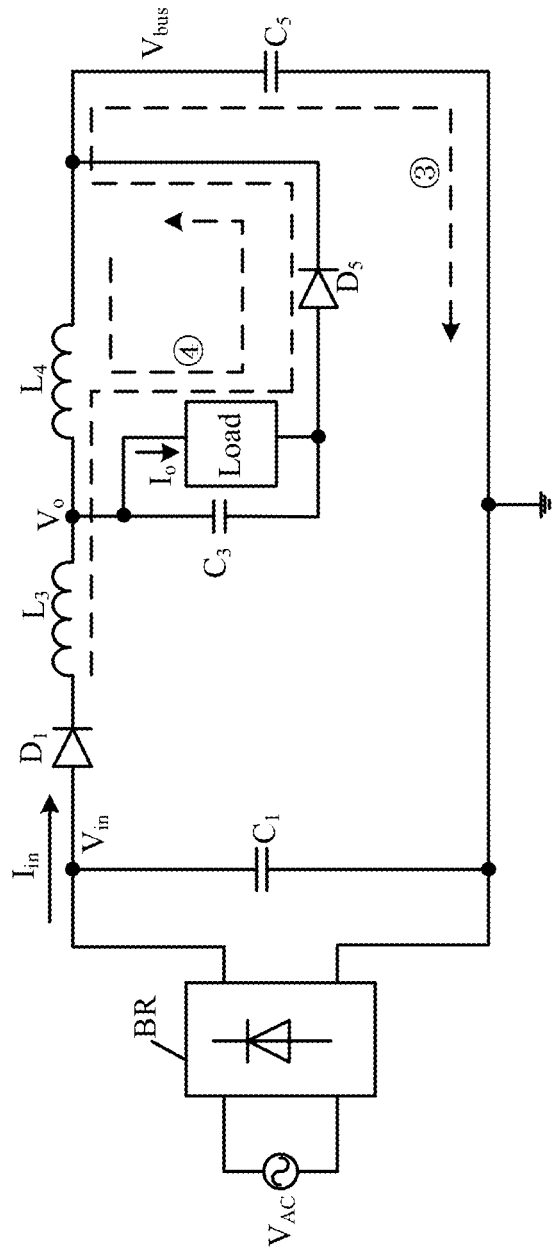
FIG. 5C shows a conductive path diagram for the AC-DC power converter of FIG. 5A in the second operation mode.

Referring now to FIG. 5C, shown is a conductive path diagram for the AC-DC power converter of FIG. 5A when in the second operation mode. In this mode, control and driving circuit 501 can control transistor Q to be off. Inductor $L_3$, capacitor $C_3$, diode $D_5$, and capacitor $C_5$ can form a third conductive path (denoted by an encircled "3"), and current $I_1$ of inductor $L_3$ can decline (e.g., continually). Inductor $L_3$ may release energy via the third conductive path, and a portion of its energy can be provided to the load, while a remaining portion of the energy from inductor $L_3$ can be provided for charging capacitor $C_5$. Also, DC voltage $V_{bus}$ may be generated across capacitor $C_5$. Also during the second operation mode, inductor $L_4$, capacitor $C_3$, and diode $D_5$ can form a fourth conductive path (denoted by an encircled "4"), and inductor $L_4$ may transfer energy to the load via the fourth conductive path.

Diode $D_5$ may be used as a continuing current flow path of inductor $L_3$ and $L_4$. In this particular example, the first and third conductive paths may form a boost-buck power stage circuit. The boost-buck power stage circuit can convert sine half-wave DC input voltage $V_{in}$ into a substantially constant DC voltage $V_{bus}$ across capacitor $C_5$. Also, the second and fourth conductive paths can form a buck power stage circuit. The buck power stage circuit can receive DC voltage $V_{bus}$, and may generate a substantially constant output voltage $V_o$ and a substantially constant output current $I_o$ to drive the load (e.g., an LED load).

The following will describe power factor correction principles of the AC-DC power converter of particular embodiments, as well as the substantially constant outputs under different operation modes. According to operating principles of the buck power stage circuit, when current of inductor $L_3$ operates in a discontinuous conduction mode (DCM) and inductor $L_4$ operates in BCM, output current $I_o$ can be obtained by formula (5).

$$I_o = \frac{I_{pk3}}{2} \times \frac{T_{on} + T_{off3}}{T_s} + \frac{I_{pk4}}{2} \times \frac{T_{on} + T_{off4}}{T_s} \quad (5)$$

For example, $I_{pk3}$ can denote a peak value of the current of inductor $L_3$, and $I_{pk4}$ can denote a peak value of the current of inductor $L_4$. Also, $t_{off3}$ can denote the time during which the current of inductor $L_3$ drops to zero from its peak value, and $t_{off4}$ can denote the time during which the current of inductor $L_3$ drops to zero from its peak value. Further, $t_S$ may denote a switching period (e.g., the sum of $t_{on}$ and $t_{off4}$). For example, the peak value of the current of inductor $L_3$ can be obtained as below by formula (5.1).

$$I_{pk3} = \frac{V_{in} - V_o}{L_3} \times t_{on} \quad (5.1)$$

Here, $V_{in}$ can denote the sine half-wave DC input voltage, $V_o$ can denote the output voltage, $L_3$ can denote the inductance value of inductor $L_3$, and $t_{on}$ can denote the conduction time of switch Q. The peak current of inductor $L_4$ can be obtained as below by formula (5.2).

$$I_{pk4} = \frac{V_{bus} - V_o}{L_4} \times t_{on} \quad (5.2)$$

Here, $V_{bus}$ can denote DC voltage $V_{bus}$ across capacitor $C_5$, and $L_4$ can denote the inductance value of inductor $L_4$. In addition, time $t_{off3}$ during which the current of inductor $L_3$ drops to zero from its peak value can be obtained as below by formula (5.3).

$$t_{off3} = \frac{V_{in} - V_o}{V_{bus} + V_o - V_{in}} \times t_{on} \quad (5.3)$$

Time $t_{off4}$ during which current of inductor $L_4$ drops to zero from its peak value can be obtained by formula (5.4).

$$t_{off4} = \frac{V_{bus} - V_o}{V_o} \times t_{on} \quad (5.4)$$

A switching period $t_S$ of transistor Q can be determined as below by formula (5.5).

$$t_S = t_{on} + t_{off4} = \frac{V_{bus}}{V_o} \times t_{on} \quad (5.5)$$

By rearranging formulas of $I_{pk3}$, $I_{pk4}$, $t_{off3}$, $t_{off4}$ and $t_S$ into formula (5), output current $I_o$ can be determined as below per formula (6).

$$I_o = \frac{t_{on}}{2V_{bus}} \times \left[ \frac{(V_{in} - V_o)^2 \times V_o}{(V_{bus} + V_o - V_{in}) \times L_2} + \frac{(V_{bus} - V_o)^2}{L_4} \right] \quad (6)$$

As can be seen formula (6), in order to make output current $I_o$ substantially constant, only conduction time $t_{on}$ may be controlled to make the product of conduction time $t_{on}$ and the following polynomial to be a constant value. Similarly, in this particular example, control and driving circuit 501 can adjust conduction time $t_{on}$ to control output current $I_o$ to be substantially constant by primary side control according to peak value $I_{pk3}$ of the first current of inductor $L_3$, peak value $I_{pk3}$ of the current of inductor $L_4$, time $t_{off3}$ during which current of inductor $L_3$ drops to zero from its peak value, and time $t_{off4}$ during which current of inductor $L_4$ drops to zero from its peak value.

According to the operating principles of a boost power stage circuit, input current $I_{in}$ of the AC-DC power converter (the first current $I_1$ of the third inductor $L_3$) can be obtained by the following formula (7).

$$I_1 = \frac{I_{pk3}}{2} \times \frac{t_{on} + t_{off3}}{t_S} \quad (7)$$

For example, $t_{on}$ can be obtained from the above formula (6), as shown below in formula (7.1).

$$t_{on} = 2 \times I_o \times V_{bus} \times \frac{(V_{bus} + V_o - V_{in}) \times L_3 \times L_4}{(V_{in} - V_o)^2 \times V_o \times L_4 + (V_{bus} - V_o)^2 \times L_3 \times (V_{bus} + V_o - V_{in})} \quad (7.1)$$

By rearranging the computational formulas of $I_{pk3}$, $t_{on}$, $t_{off3}$ and $t_S$ into formula (7), the input current can be determined as below per formula (8).

$$I_{in} = V_{in} \times \frac{V_o \times I_o V_{bus} \times L_4}{(V_{in} - V_o)^2 \times V_o \times L_4 + (V_{bus} - V_o)^2 \times L_3 \times (V_{bus} + V_o - V_{in})} \quad (8)$$

From formula (8), it is clear that as DC voltage $V_{bus}$ is relatively large, the next multinomial can be approximated as a constant. Thus, the input current $I_{in}$ can vary approximately along with variation of the sine half-wave DC input voltage $V_{in}$, so as to realize power factor correction. As can be seen from this example, only one transistor and one control and driving circuit may be utilised to satisfy the circuit driving requirements. Also, power factor correction and output of a substantially constant signal can be achieved. Moreover, the voltage-withstanding requirement of the third energy storage element (e.g., capacitor $C_5$) may be relatively small, further reducing overall costs.

Figure 6A:
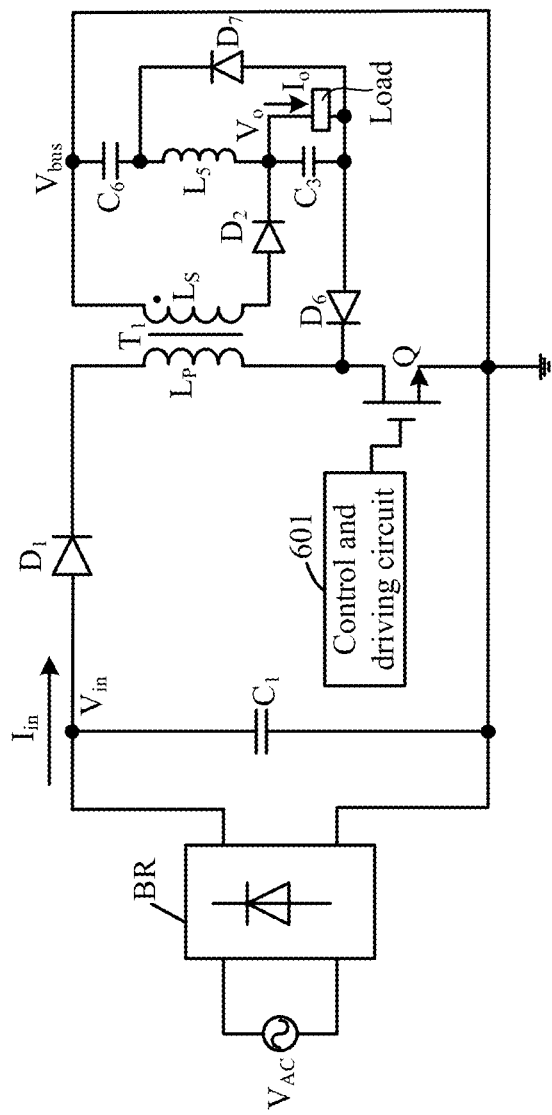
FIG. 6A is a schematic block diagram of a fourth example AC-DC power converter in accordance with embodiments of the present invention.

Referring now to FIG. 6A, shows is a schematic block diagram of a fourth example AC-DC power converter in accordance with embodiments of the present invention. In this particular example, the first energy storage element of the AC-DC power converter is transformer $T_1$, the second energy storage element is inductor $L_5$, and the third energy storage element is capacitor $C_6$.

Figure 6B:
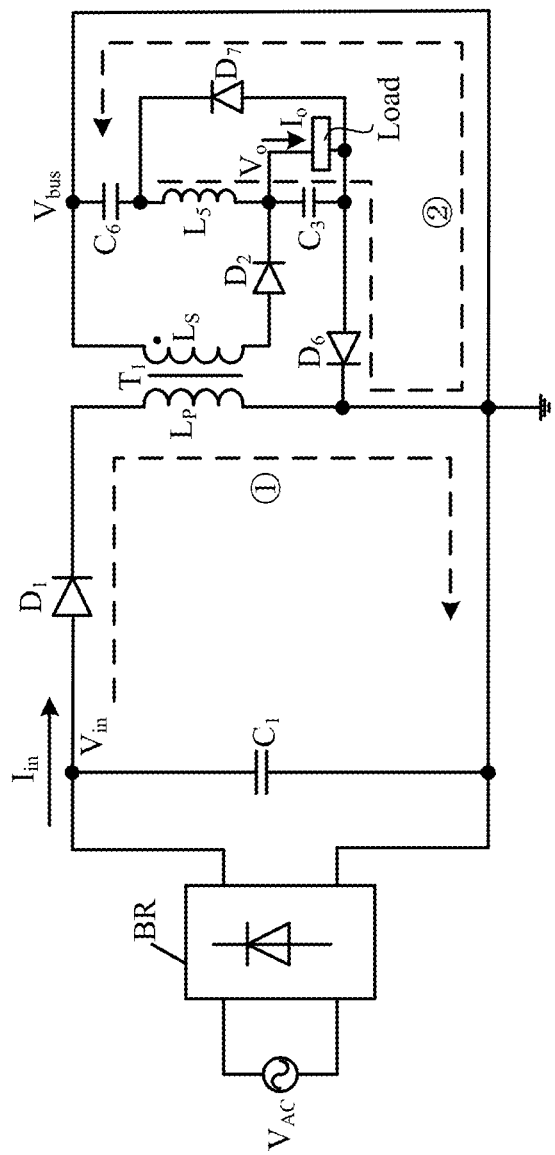
FIG. 6B shows a conductive path diagram for the AC-DC power converter of FIG. 6A in the first operation mode.

Referring now to FIG. 6B, shown is a conducing path diagram for the AC-DC power converter of FIG. 6A when in the first operation mode. In this mode, the control and driving circuit 601 can control transistor Q to turn on. Also, diode $D_1$, primary side windings $L_P$ of transformer $T_1$, and transistor Q can form a first conductive path (denoted by an encircled "1"). In the first operation mode, sine half-wave DC input voltage $V_{in}$ can store energy in transformer $T_1$ via the first conductive path, and current $I_1$ of the primary side windings of transformer $T_1$ can rise (e.g., continually).

Also during the first operation mode, capacitor $C_6$, inductor $L_5$, capacitor $C_3$, diode $D_6$, and transistor Q can form a second conductive path (denoted by an encircled "2"). Via the second conductive path, capacitor $C_6$ can release energy, and inductor $L_5$ can store energy. Also, current $I_2$ of inductor $L_5$ can rise, and energy stored in capacitor $C_6$ may also be provided to the load.

Figure 6C:
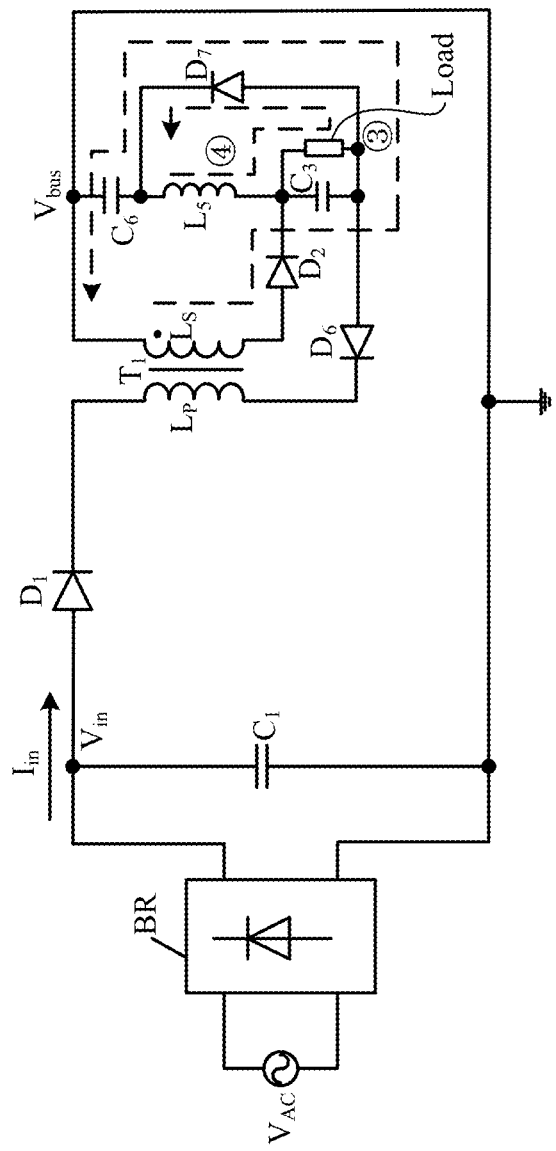
FIG. 6C shows a conductive path diagram for the AC-DC power converter of FIG. 6A in the second operation mode.

Referring now to FIG. 6C, shown is a conductive path diagram for the AC-DC power converter of FIG. 6A when in the second operation mode. In this mode, control and driving circuit 601 can control transistor Q to turn off. The secondary side windings of transformer $T_1$, diode $D_2$, capacitor $C_3$, diode $D_7$, and capacitor $C_6$ may form a third conductive path (denoted by an encircled "3"). Via the third conductive path, transformer $T_1$ may release energy, and current $I_1$ of transformer $T_1$ can decline (e.g., continually). A portion of the energy transformer $T_1$ may be provided to the load, while a remaining portion of the energy from transformer $T_1$ may be for charging capacitor $C_6$ to generate DC voltage $V_{bus}$.

Also in the second operation mode, in Dr. $L_5$, capacitor $C_3$, and diode $D_7$ may form a fourth conductive path (denoted by an encircled "4"). Inductor $L_5$ may transfer energy to the load via the fourth conductive path. Here, the first conductive and third conductive paths may form a flyback power stage circuit. The flyback power stage circuit can receive sine half-wave DC input voltage $V_{in}$, and may generate a substantially constant DC voltage $V_{bus}$ across capacitor $C_6$. Also, the second and fourth conductive paths may form a buck power stage circuit. The buck power stage circuit can receive $V_{bus}$ across capacitor $C_6$, and may generate via the fourth conductive path, a substantially constant output voltage $V_o$ and a substantially constant output current $I_o$ to drive the load (e.g., an LED). In the example AC-DC power converter of FIG. 6A, the first and second conductive paths may share transistor Q and control and driving circuit 601.

In particular embodiments, an AC-DC power converter may satisfy circuit driving requirements with a transistor and a control and driving circuit, by using two-stage power stage circuits. Power factor correction can be achieved, and a substantially constant electrical signal (e.g., voltage, current) can be provided at the output. This approach can provide relatively high control accuracy, small ripples, and steady output signals. Also, the voltage-withstanding or breakdown requirement of the third energy storage element (e.g., capacitor $C_6$) may be relatively small, and thus the overall costs can be reduced.

Those skilled in the art will recognize that other techniques or structures, as well as circuit layout, arrangement, components, etc., can be applied to the described embodiments. For example, the first stage power stage circuit of the may be used to realize a power factor correction function, while the second stage power stage circuit can be used to realize substantially constant control for the output electrical signal (e.g., voltage, current). In addition, the power stage circuitry can include any suitable topology (e.g., boost, buck, boost-buck, flyback, forward, etc.). As such, the conductive paths as described herein may vary, such as including additional or different components, based on the given power stage topology.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:
1. An AC-DC power converter, comprising:
 a) a rectifier bridge and filter configured to convert an external AC voltage to a sine half-wave DC input voltage;
 b) a first energy storage element configured to store energy from said sine half-wave DC input voltage via a first current through a first conductive path during a first operation mode, wherein said first current rises during said first operation mode;
 c) a second energy storage element configured to store energy from a second DC voltage via a second current through a second conductive path during said first operation mode, wherein said second current rises during said first operation mode;
 d) a transistor configured to share said first and second conductive paths;
 e) said first energy storage element being configured to release energy to a third energy storage element and a load through a third conductive path during a second operation mode, wherein said third energy storage element is configured to generate said second DC voltage, and wherein said first current declines during said second operation mode; and
 f) said second energy storage element being configured to release energy to said load through a fourth conductive path during said second operation mode, wherein a peak value of said first current is configured to vary along with said sine half-wave DC input voltage, and wherein an output of said AC-DC converter is configured to be substantially constant.

2. The AC-DC power converter of claim 1, wherein:
a) said first energy storage element comprises a first inductor;
b) said second energy storage element comprises a second inductor; and
c) said third energy storage element comprises a capacitor.

3. The AC-DC power converter of claim 1, wherein:
a) said transistor is on during said first operation mode; and
b) said transistor is off during said second operation mode.

4. The AC-DC power converter of claim 1, wherein a first power stage circuit comprises said first and third energy storage elements, and said first and third conductive paths.

5. The AC-DC power converter of claim 1, wherein a second power stage circuit comprises said second energy storage element, and said second and fourth conductive paths.

6. The AC-DC power converter of claim 1, configured to provide a substantially constant output current to drive a light-emitting diode (LED) load.

7. The AC-DC power converter of claim 1, wherein said first conductive path is formed during each switching cycle of said AC-DC power converter.

8. The AC-DC power converter of claim 1, wherein said first and second operation modes occur during a switching cycle of said AC-DC power converter.

9. The AC-DC power converter of claim 1, wherein said second energy storage element comprises a transformer.

10. The AC-DC power converter of claim 1, wherein said load is configured to receive energy from said sine half-wave DC input voltage through said first conductive path in said first operation mode.

11. The AC-DC power converter of claim 10, wherein said load is configured to receive energy from said second DC voltage through said second conductive path.

12. The AC-DC power converter of claim 1, further comprising a control and driving circuit configured to receive peak current signals of said first and second currents, and to generate a driving signal to drive said transistor.

13. The AC-DC power converter of claim 12, wherein said control and driving circuit is configured to regulate an on time of said transistor in accordance with said peak current signals of said first and second currents and current decreasing time signals of said first and second currents from a peak current to zero.

14. The AC-DC power converter of claim 12, wherein said first and second currents are operated at a boundary conduction mode (BCM).

15. A method of controlling an AC-DC power converter, the method comprising:
a) converting, by a rectifier bridge and filter, an external AC voltage to a sine half-wave DC input voltage;
b) storing energy from said sine half-wave DC input voltage in a first energy storage element via a first current through a first conductive path during a first operation mode, wherein said first current rises during said first operation mode;
c) storing energy from a second DC voltage in a second energy storage element via a second current through a second conductive path during said first operation mode, wherein said second current rises during said first operation mode, and wherein said first and second conductive paths share a transistor;
d) releasing energy from said first energy storage element to a third energy storage element and a load through a third conductive path during a second operation mode, wherein said third energy storage element generates said second DC voltage, and wherein said first current declines during said second operation mode; and
e) releasing energy from said second energy storage element to said load through a fourth conductive path during said second operation mode, wherein a peak value of said first current varies along with said sine half-wave DC input voltage, and maintaining an output of said AC-DC converter as substantially constant.

16. The method of claim 15, wherein said second energy storage element comprises a transformer.

17. The method of claim 15, wherein said first and second operation modes occur during a switching cycle of said AC-DC power converter.

18. The method of claim 17, further comprising:
a) receiving energy from said sine half-wave DC input voltage in said load through said first conductive path during said first operation mode; and
b) receiving energy from said second DC voltage in said load through said second conductive path.

19. The method of claim 17, further comprising:
a) receiving, by a control and driving circuit, peak current signals of said first and second currents; and
b) generating a driving signal to drive said transistor.

20. The method of claim 17, further comprising:
a) turning on said transistor during said first operation mode; and
b) turning off said transistor during said second operation mode.

21. The method of claim 17, wherein said AC-DC power converter comprises a first power stage circuit having said first and third energy storage elements, and said first and third conductive paths.

22. The method of claim 17, wherein said AC-DC power converter comprises a second power stage circuit having said second energy storage element, and said second and fourth conductive paths.

* * * * *